US011233649B2

(12) United States Patent
Li et al.

(10) Patent No.: US 11,233,649 B2
(45) Date of Patent: Jan. 25, 2022

(54) APPLICATION PROGRAM AUTHORIZATION METHOD, TERMINAL, AND SERVER

(71) Applicant: Huawei Technologies Co., Ltd., Shenzhen (CN)

(72) Inventors: Guoqing Li, Shenzhen (CN); Xinmiao Chang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 264 days.

(21) Appl. No.: 16/471,748

(22) PCT Filed: Mar. 30, 2017

(86) PCT No.: PCT/CN2017/078774
§ 371 (c)(1),
(2) Date: Jun. 20, 2019

(87) PCT Pub. No.: WO2018/113130
PCT Pub. Date: Jun. 28, 2018

(65) Prior Publication Data
US 2019/0334718 A1 Oct. 31, 2019

(30) Foreign Application Priority Data
Dec. 22, 2016 (CN) .......................... 201611200468.0

(51) Int. Cl.
*H04L 9/32* (2006.01)
*H04L 9/08* (2006.01)
(Continued)

(52) U.S. Cl.
CPC .......... *H04L 9/3213* (2013.01); *H04L 9/0825* (2013.01); *H04L 9/14* (2013.01);
(Continued)

(58) Field of Classification Search
CPC ..... H04L 9/3226; H04L 9/3268; H04L 29/06; H04L 9/3213; H04L 9/14; H04L 9/0825;
(Continued)

(56) References Cited

U.S. PATENT DOCUMENTS

2007/0299803 A1 12/2007 Emuchay et al.
2014/0281506 A1* 9/2014 Redberg ................. H04L 63/10
713/159

(Continued)

FOREIGN PATENT DOCUMENTS

CN 103051630 A 4/2013
CN 105404800 A 3/2016
(Continued)

OTHER PUBLICATIONS

Internet Engineering Task Force; A. Popov, M. Nystroem Microsoft Corp; D. Balfanz, Ed., A. Langley Google Inc.; J. Hodges Paypal; Mar. 21, 2016; pp. 1-89.*

*Primary Examiner* — Mohammad A Siddiqi
(74) *Attorney, Agent, or Firm* — Slater Matsil, LLP

(57) ABSTRACT

An application program authorization method includes: when a first application on a terminal is logged into, sending, by the terminal to a first application server by using the first application, a first request message used for negotiating a token binding identifier of the first application; receiving, by the terminal, a first response message including generation information of the token binding identifier from the first application server; generating, by the terminal, the token binding identifier based on the generation information of the token binding identifier, and sending the token binding identifier to the first application server; and when the at least one second application on the terminal logs in by using the first application, sending, by the terminal to the first appli-
(Continued)

cation server, a second request message, where the second request message includes the token binding identifier.

13 Claims, 6 Drawing Sheets

(51) Int. Cl.
*H04L 9/14* (2006.01)
*H04L 9/30* (2006.01)

(52) U.S. Cl.
CPC .............. *H04L 9/30* (2013.01); *H04L 9/3226* (2013.01); *H04L 9/3268* (2013.01)

(58) Field of Classification Search
CPC .. H04L 9/30; H04W 12/084; H04W 12/0471; H04W 12/069; H04W 12/03
See application file for complete search history.

(56) References Cited

U.S. PATENT DOCUMENTS

| 2015/0150109 | A1 | 5/2015 | Bocanegra et al. |
| 2015/0180870 | A1 | 6/2015 | Zhang et al. |
| 2015/0339662 | A1* | 11/2015 | Huang ................. H04L 9/3271 705/67 |
| 2016/0105410 | A1 | 4/2016 | Zhou et al. |
| 2017/0289197 | A1* | 10/2017 | Mandyam .............. H04L 63/06 |
| 2018/0167397 | A1* | 6/2018 | Zhang ................... H04L 63/102 |

FOREIGN PATENT DOCUMENTS

| CN | 105897668 A | 8/2016 |
| CN | 104125063 B | 10/2016 |
| CN | 106156549 A | 11/2016 |
| WO | 2014173053 A1 | 10/2014 |

\* cited by examiner

APPLICATION PROGRAM AUTHORIZATION METHOD, TERMINAL, AND SERVER

CROSS REFERENCE TO RELATED APPLICATIONS

This application claims priority to Chinese Patent No. 201611200468.0, filed with the Patent Office of the State Intellectual Property Office of China on Dec. 22, 2016, and entitled "APPLICATION PROGRAM AUTHORIZATION METHOD AND TERMINAL," which is incorporated herein by reference in its entirety.

TECHNICAL FIELD

The present invention relates to the field of information security technologies, and in particular, to an application program authorization method, a terminal, and a server.

BACKGROUND

With development of communications technologies, a quantity of network platforms is ever increasing. Before using different network platforms, people usually need to get registered. Third-party application authorized login is more widely used because a user is allowed to log into and use a network platform of a third-party application by using an account on an authorized platform, not requiring registration, and developing an autonomous registration system may also be omitted for network platform developers. However, third-party authorized login involves authorization of a third-party application by opening up an authorization platform.

According to an open standard OAuth protocol formulated by the Internet Engineering Task Force (IETF), a user (Resource Owner) is allowed to permit a third-party application (Client) to access a private resource (such as a nickname, a head portrait, a photo, a video, or a contact list) stored by the user on a website, without providing a username and a password to the third-party application. In a procedure of the OAuth protocol, the third-party application requests a resource access token (Access token) from an authorization server by submitting a static third-party application identifier (Client id) only. After checking the third-party application identifier and authentication information of the user, the authorization server issues an authorization code and the resource access token. When using the resource access token, an application on a terminal does not need to submit a user identifier. Therefore, an Open Authorization (OAuth) protocol-defined token is a non-binding token. A resource server may allow any entity holding the token to access a resource on the resource server. In this case, an attacker may launch a replay attack (Replay Attack) after intercepting the token. To be specific, after intercepting the token, the attacker submits the token to the resource server and bypasses user perception to obtain a resource stored by the user on the resource server.

To reduce replay attack risks, related work groups of the IETF propose to add a token identifier to the resource access token. Before using a token, the third-party application needs to negotiate a token binding identifier with the resource server. When the token is used, the token binding identifier needs to be submitted at the same time, so that the server performs comparison on the identifier and determines whether an entity that submits the token to obtain a resource is an entity that applies for the token. The token binding identifier needs to be negotiated when a transport layer security (TLS) protocol-based connection is being established between the terminal and the server, and this function can be implemented only when TLS protocol versions supported by both the terminal and the server are upgraded. In addition, each third-party application on the terminal needs to negotiate the token binding identifier when establishing a connection with the server to obtain the token. This increases a burden at a server end and leads to relatively low efficiency.

The Chinese patent CN104125063B discloses an authorization authentication method, a device, and a system, where an identifier in a third-party application is added to an authorization token to replace a user account. Both the terminal and the server need to maintain the identifier in the third-party application, and the server also needs to allocate an identifier (Identifier, ID) to each application requesting authorization on the terminal, thereby increasing a burden of the server and leading to relatively low efficiency.

To sum up, a prior-art problem lies in that a risk of replay attack after an attacker intercepts a token is present in the OAuth protocol. A token binding identifier mechanism requires each third-party application on the terminal to perform negotiation before establishing a connection to the server, to obtain the token, and requires upgrading the TLS protocol at both a client end and the server end. A key algorithm supported by the server is relatively fixed, and each third-party application on the same terminal needs to negotiate with the server, thereby increasing the burden of the server and leading to relatively low efficiency. In addition, according to the OAuth protocol, when a social network site (SNS) account, such as QQ, WeChat, Weibo, or Alipay, is used for authorized log into a third-party application, because the social application on the terminal has been installed and accessed, the user is not required to provide an account and a password during an authorization process to verify whether a user initiating the authorization is a real user of the social application, the third-party application is directly permitted to obtain a user authentication status stored in the terminal, and authorization is immediately completed by clicking Confirm. In this case, if the terminal in an unlocked state is used by another user, the account is likely to be abused.

SUMMARY OF THE INVENTION

Embodiments of the present invention provide an application program authorization method, a terminal, and a server, to resolve prior-art problems of a security risk, a heavy burden on a server, and low efficiency in an application authorization process.

According to a first aspect, an embodiment of the present invention provides an application program authorization method. A terminal includes a first application and at least one second application, and the method includes: when the first application on the terminal is logged into successfully, sending, by the terminal, a first request message to a first application server by using the first application, where the first request message is used for negotiating a token binding identifier of the first application; receiving, by the terminal, a first response message from the first application server, where the first response message includes generation information of the token binding identifier; generating, by the terminal, the token binding identifier based on the generation information of the token binding identifier, and sending the token binding identifier to the first application server; and when the at least one second application on the terminal logs in by using the first application, sending, by the terminal, a second request message to the first application server, where the second request message is used for obtaining resource access permission of the first application server, and the second request message includes the token binding identifier.

In the application program authorization method provided in this embodiment of the present invention, the terminal negotiates the token binding identifier with the first application server. When third-party applications, such as the second application and a third application, require the first application to authorize using an account of the first application to log into corresponding servers of the third-party applications, the third-party applications may directly use the token binding identifier that is negotiated by the terminal and the first application server, without a need to separately negotiate the token binding identifier with the first application server. This simplifies an authorization procedure, and reduces a burden on the first application server.

In a possible implementation, the generation information of the token binding identifier includes an asymmetric encryption algorithm list supported by the first application server, and the terminal includes security hardware; and the generating, by the terminal, the token binding identifier based on the generation information of the token binding identifier includes: determining, by the terminal based on the asymmetric encryption algorithm list, an asymmetric encryption algorithm for generating the token binding identifier, where the security hardware supports the asymmetric encryption algorithm; and generating, by the terminal, a public key and a private key based on the asymmetric key algorithm, where the public key is the token binding identifier.

In a possible implementation, the generating, by the terminal, the token binding identifier based on the generation information of the token binding identifier includes: determining, by the terminal, a validity period of the token binding identifier; and protecting, by the terminal, the private key by using the security hardware.

In a possible implementation, the sending, by the at least one second application on the terminal, a second request message to the first application server includes: receiving, by the terminal, user-input personal identification information, and when the terminal determines that the user-input personal identification information is consistent with personal identification information stored in the terminal, sending, by the at least one second application on the terminal, the second request message to the first application server.

In a possible implementation, after the generating, by the terminal, the token binding identifier based on the generation information of the token binding identifier, the method further includes: receiving, by the terminal, user-entered personal identification information, where the entered personal identification information is the personal identification information stored in the terminal; and binding, by the terminal, the entered personal identification information to the token binding identifier, where the entered personal identification information is used for accessing the token binding identifier. According to this implementation, after the terminal negotiates the token binding identifier with the first application server, the terminal receives the user-entered personal identification information corresponding to the account of the first application, and needs to verify personal identification information when authorizing using the account of the first application to log into a server of a third-party application. This effectively prevents a terminal device holder from using account information of an account owner to log into the third-party application without obtaining consent from the account owner, and prevents an asset associated with the account of the first application from being abused.

In a possible implementation, the personal identification information is at least one of the following information: a fingerprint, an iris, voice, a personal identification number PIN code, an unlocking pattern, and the like.

In a possible implementation, the first request message includes a device certificate of the terminal and login status information of the first application; or includes a service certificate of the first application and login status information of the first application.

In a possible implementation, the second request message includes identification information of the at least one second application.

According to a second aspect, an embodiment of the present invention provides an application program authorization method. The method includes: receiving, by a first application server, a first request message from a terminal, where the first request message is used for requesting to negotiate a token binding identifier of the first application; sending, by the first application server, a first response message to the terminal, where the first response message includes generation information of the token binding identifier; receiving, by the first application server, the token binding identifier from the terminal; and receiving, by the first application server, a second request message from the terminal, where the second request message is used for obtaining resource access permission of the first application server, and the second request message includes the token binding identifier.

In a possible implementation, the generation information of the token binding identifier includes an asymmetric key algorithm list supported by the first application server, and the token binding identifier is a public key in a key pair generated by the terminal.

In a possible implementation, the first request message includes a device certificate of the terminal and login status information of the first application; or includes a service certificate of the first application and login status information of the first application.

In a possible implementation, the second request message includes identification information of at least one second application.

According to a third aspect, an embodiment of the present invention provides a terminal. The terminal may implement functions performed by the terminal in the application program authorization method in the first aspect. The functions may be implemented by hardware, or may be implemented by hardware executing corresponding software. The hardware or software includes one or more modules corresponding to the foregoing functions.

In a possible design, the terminal includes a first application and at least one second application, and includes a sending module, a receiving module, and a processing module. The sending module is configured to, when the first application on the terminal is logged into successfully, send a first request message to a first application server by using the first application, where the first request message is used for negotiating a token binding identifier of the first application. The receiving module is configured to receive a first response message from the first application server, where the first response message includes generation information of the token binding identifier. The processing module is configured to generate the token binding identifier based on the generation information of the token binding identifier, and send the token binding identifier to the first application server. The sending module is further configured to, when the at least one second application on the terminal logs in by using the first application, send a second request message to the first application server by using the at least second application, where the second request message is used for obtaining resource access permission of the first application server, and the second request message includes the token binding identifier.

In a possible design, the generation information of the token binding identifier includes an asymmetric encryption algorithm list supported by the first application server, and the terminal includes security hardware; and that the processing module generates the token binding identifier based on the generation information of the token binding identifier includes: the processing module determines, based on the asymmetric encryption algorithm list, an asymmetric encryption algorithm for generating the token binding identifier, where the security hardware supports the asymmetric encryption algorithm; and the processing module generates a public key and a private key based on the asymmetric key algorithm, where the public key is the token binding identifier.

In a possible design, that the processing module generates the token binding identifier based on the generation information of the token binding identifier includes: determining a validity period of the token binding identifier, and protecting the private key by using the security hardware.

In a possible design, the processing module is further configured to, before the sending module sends the second request message to the first application server by using the at least one second application, determine that user-input personal identification information is consistent with personal identification information stored in the terminal. The receiving module is further configured to receive the user-input personal identification information.

In a possible design, the receiving module is further configured to, after the processing module generates the token binding identifier based on the generation information of the token binding identifier, receive user-entered personal identification information, where the entered personal identification information is the personal identification information stored in the terminal. The processing module is further configured to bind the entered personal identification information to the token binding identifier, where the entered personal identification information is used for accessing the token binding identifier.

In a possible design, the personal identification information is at least one of the following information: a fingerprint, an iris, voice, a personal identification number PIN code, an unlocking pattern, and the like.

In a possible design, the first request message includes a device certificate of the terminal and login status information of the first application; or includes a service certificate of the first application and login status information of the first application.

In a possible design, the second request message includes identification information of the at least one second application.

According to a fourth aspect, an embodiment of the present invention provides an application server. The application server may implement functions performed by the application server in the application program authorization method in the second aspect. The functions may be implemented by hardware, or may be implemented by hardware executing corresponding software. The hardware or software includes one or more modules corresponding to the foregoing functions.

In a possible design, the application server includes a receiving module and a sending module. The receiving module is configured to receive a first request message from a terminal, where the first request message is used for requesting to negotiate a token binding identifier of the first application. The sending module is configured to send a first response message to the terminal, where the first response message includes generation information of the token binding identifier. The receiving module is further configured to receive the token binding identifier from the terminal, and the receiving module is further configured to receive a second request message from the terminal, where the second request message is used for obtaining resource access permission of the first application server, and the second request message includes the token binding identifier.

In a possible design, the generation information of the token binding identifier includes an asymmetric key algorithm list supported by the first application server, and the token binding identifier is a public key in a key pair generated by the terminal.

In a possible design, the first request message includes a device certificate of the terminal and login status information of the first application; or includes a service certificate of the first application and login status information of the first application.

In a possible design, the second request message includes identification information of at least one second application.

According to a fifth aspect, an embodiment of the present invention provides a terminal. The terminal may implement functions performed by the terminal in the application program authorization method in the first aspect. The functions may be implemented by hardware, or may be implemented by hardware executing corresponding software. The hardware or software includes one or more modules corresponding to the foregoing functions.

In a possible design, the terminal includes a first application and at least one second application, and includes a processor, a memory, and a communications interface. The memory is configured to store a program instruction. The processor is configured to perform the following operations based on the program instruction stored in the memory: instructing the wireless communications interface to, when the first application on a terminal is logged into successfully, send a first request message to a first application server by using the first application, where the first request message is used for negotiating a token binding identifier of the first application; instructing the wireless communications interface to receive a first response message from the first application server, where the first response message includes generation information of the token binding identifier; generating the token binding identifier based on the generation information of the token binding identifier, and sending the token binding identifier to the first application server; and instructing the wireless communications interface to, when the at least one second application on the terminal logs in by using the first application, send a second request message to the first application server, where the second request message is used for obtaining resource access permission of the first application server, and the second request message includes the token binding identifier.

In a possible design, the generation information of the token binding identifier includes an asymmetric encryption algorithm list supported by the first application server, and the terminal includes security hardware; and that the processor is configured to perform the following operation based on the program instruction stored in the memory: generating the token binding identifier based on the generation information of the token binding identifier includes: determining, based on the asymmetric encryption algorithm list, an asymmetric encryption algorithm for generating the token binding identifier, where the security hardware supports the asymmetric encryption algorithm; and generating a public key and a private key based on the asymmetric key algorithm, where the public key is the token binding identifier.

In a possible design, that the processor is configured to perform the following operation based on the program instruction stored in the memory: generating the token binding identifier based on the generation information of the token binding identifier includes: determining a validity period of the token binding identifier, and protecting the private key by using the security hardware.

In a possible design, the terminal further includes an input unit, and the processor is further configured to perform the following operations based on the program instruction stored in the memory: before instructing the wireless communications interface to send the second request message to the first application server, instructing the input unit to receive user-input personal identification information, and determining that the user-input personal identification information is consistent with personal identification information stored in the terminal.

In a possible design, the processor is further configured to perform the following operations based on the program instruction stored in the memory: after generating the token binding identifier based on the generation information of the token binding identifier, instructing the input unit to receive user-entered personal identification information, where the entered personal identification information is the personal identification information stored in the terminal; and binding the entered personal identification information to the token binding identifier, where the entered personal identification information is used for accessing the token binding identifier.

In a possible design, the personal identification information is at least one of the following information: a fingerprint, an iris, voice, a personal identification number PIN code, an unlocking pattern, and the like.

In a possible design, the first request message includes a device certificate of the terminal and login status information of the first application; or includes a service certificate of the first application and login status information of the first application.

In a possible design, the second request message includes identification information of the at least one second application.

According to a sixth aspect, an embodiment of the present invention provides an application server, where the application server may implement functions performed by the application server in the application program authorization method in the second aspect. The functions may be implemented by hardware, or may be implemented by hardware executing corresponding software. The hardware or software includes one or more modules corresponding to the foregoing functions.

In a possible design, the application server includes a processor, a memory, and a communications interface. The memory is configured to store a program instruction. The processor is configured to perform the following operations based on the program instruction stored in the memory: instructing the communications interface to receive a first request message from a terminal, where the first request message is used for requesting to negotiate a token binding identifier of a first application; instructing the communications interface to send a first response message to the terminal, where the first response message includes generation information of the token binding identifier; instructing the communications interface to receive the token binding identifier from the terminal; and instructing the communications interface to receive a second request message from the terminal, where the second request message is used for obtaining resource access permission of the first application server, and the second request message includes the token binding identifier.

In a possible design, the generation information of the token binding identifier includes an asymmetric key algorithm list supported by the first application server, and the token binding identifier is a public key in a key pair generated by the terminal.

In a possible design, the first request message includes a device certificate of the terminal and login status information of the first application; or includes a service certificate of the first application and login status information of the first application.

In a possible design, the second request message includes identification information of at least one second application.

Compared with the prior art, in the application program authorization method provided in the embodiments of the present invention, the terminal negotiates the token binding identifier with the first application server. When third-party applications, such as the second application and a third application, require the first application to authorize using an account of the first application to log into corresponding servers of the third-party applications, the third-party applications may directly use the token binding identifier that is negotiated by the terminal and the first application server, without a need to separately negotiate the token binding identifier with the first application server. This simplifies an authorization procedure, and reduces a burden on the first application server. In addition, after the terminal negotiates the token binding identifier with the first application server, the terminal receives the user-entered personal identification information corresponding to the account of the first application, and needs to verify personal identification information when authorizing using the account of the first application to log into a server of a third-party application. This effectively prevents a terminal device holder from using account information of an account owner to log into the third-party application without obtaining consent from the account owner, and prevents an asset associated with the account of the first application from being abused.

DETAILED DESCRIPTION OF ILLUSTRATIVE EMBODIMENTS

The following describes the technical solutions in the embodiments of the present invention with reference to the accompanying drawings in the embodiments of the present invention.

A network architecture and a service scenario described in the embodiments of the present invention are intended to describe the technical solutions in the embodiments of the present invention more clearly, and do not constitute any limitation on the technical solutions provided in the embodiments of the present invention. A person of ordinary skill in the art may understand that with evolution of network architectures and emergence of new service scenarios, the technical solutions provided in the embodiments of the present invention are also applicable to a similar technical problem.

Figure 1:
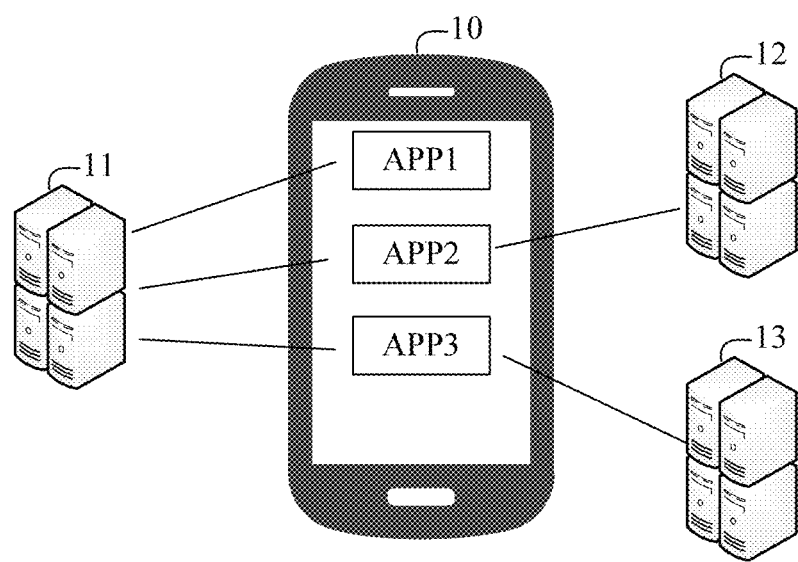
FIG. 1 is a diagram of an application scenario according to an embodiment of the present invention.

FIG. 1 is a diagram of an application scenario according to an embodiment of the present invention. As shown in FIG. 1, this embodiment of the present invention relates to a terminal 10, and a plurality of applications (APP) may be installed simultaneously on the terminal. The terminal may communicate with a server of an installed application or a server of another installed application by using the application. For example, the applications installed on the terminal are an APP1, an APP2, and an APPS, and corresponding application servers are an application server 11, an application server 12, and an application server 13. After the APP1 logs into the server 11 by using an account and a password, the APP1 may authorize the APP2 to log into the server 12 by using the account and the password of the APP1, and allow the APP2 to access some resources of the server 11. Likewise, the APP1 may also authorize the APP3 to log into the server 13 by using the account and login status information of the APP1, and allow the APP3 to access some resources of the server 11.

The application server 11 in this embodiment of the present invention includes an authorization server and a resource server. The authorization server and the resource server may be a same server, or may be different servers.

The terminal 10 in this embodiment of the present invention may be a device that provides data connectivity for a user. The terminal may communicate with an application server by using an application client. The terminal may be a mobile terminal, for example, a mobile phone (or referred to as a "cellular" phone), or a computer with a mobile terminal. For example, the terminal may be a portable, pocket-sized, handheld, computer built-in, or in-vehicle mobile apparatus, which exchanges voice and/or data with a radio access network, for example, a device such as a personal communication service (PCS) phone, a cordless telephone set, a Session Initiation Protocol (SIP) phone, a wireless local loop (WLL) station, or a personal digital assistant (PDA). The terminal may also be referred to as a system, a subscriber unit (Subscriber Unit), a subscriber station (Subscriber Station), a mobile station (Mobile Station), a mobile console (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment, UE).

In the application program authorization method provided in this embodiment of the present invention, the terminal negotiates a token binding identifier with a first application server. When third-party applications, such as a second application and a third application, require a first application to authorize using an account or login status information (for example, a nickname, a user name, a head portrait, a login status token, or a login credential of a user account in the first application) of the first application to log into corresponding servers of the third-party applications, the third-party applications may directly use the token binding identifier that is negotiated by the terminal and the first application server, without a need to separately negotiate the token binding identifier with the first application server. This simplifies an authorization procedure, and reduces a burden on the first application server.

Figure 2:
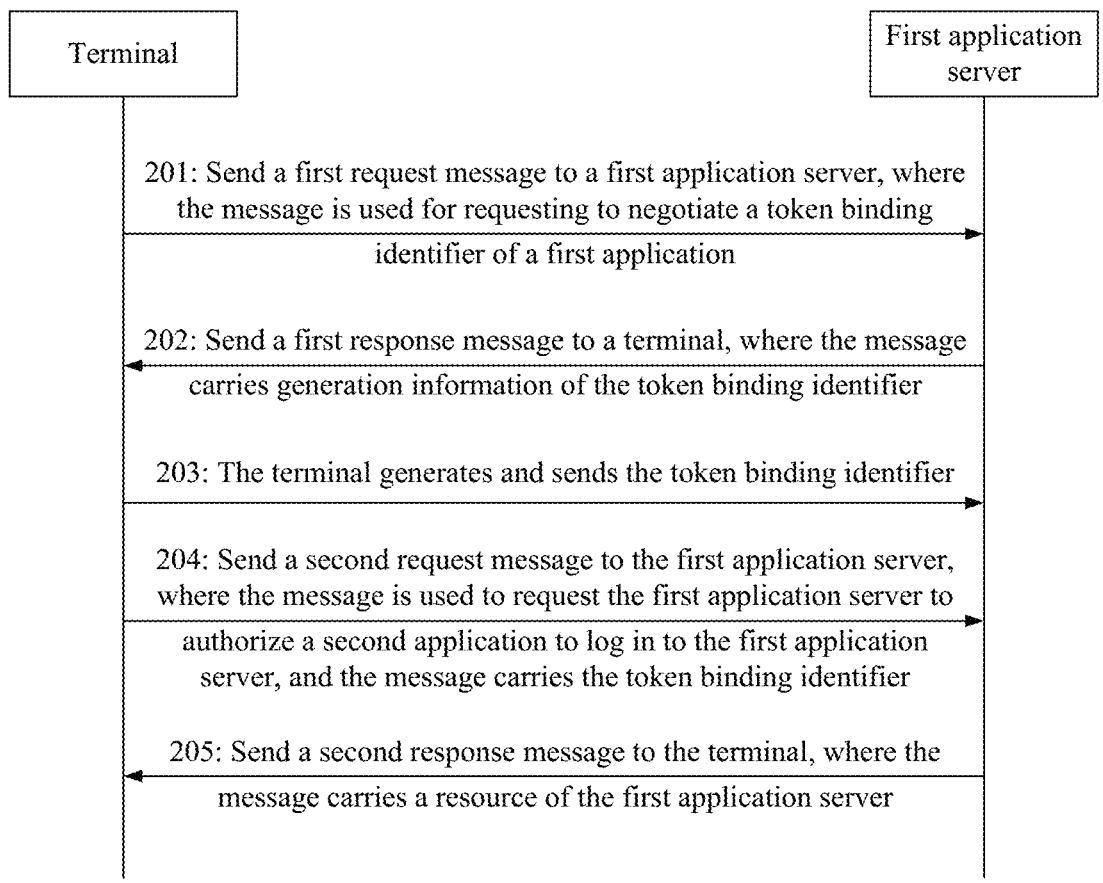
FIG. 2 is a schematic flowchart of an application program authorization method according to an embodiment of the present invention.

FIG. 2 is a schematic flowchart of an application program authorization method according to an embodiment of the present invention. As shown in FIG. 2, the embodiment may include the following steps.

Step 201: When a first application on a terminal is logged into successfully, the terminal sends a first request message to a first application server by using the first application, where the first request message is used for negotiating a token binding identifier of the first application.

For example, that the first application on the terminal is logged into successfully specifically includes: the terminal sends information of the first application, for example, an account and a password, to the first application server by using the first application; the first application server generates a login credential based on the information of the first application, for example, the account and the password, where the login credential may be a login token or an authentication code; and the terminal receives the login credential by using the first application, and saves the login credential into security hardware, for example, a trusted execution environment (TEE) or a secure element (SE). It should be noted that the TEE and a rich execution environment (REE) that is generally an operating environment without a specific security function coexist in the mobile terminal. The TEE is capable of providing a secure and attack-free operating environment for a trusted application (Trusted Application). The TEE has storage space that is invisible to the REE and that is implemented by using a secure storage technology. In addition, the TEE also manages peripherals, so as to ensure that the peripherals to which the TEE environment is connected are secure. Therefore, the TEE can ensure that an asset (for example, a key, data, or software) in the storage space of the TEE is free from a software attack, to resist a security threat of a particular type. Only an application that is authenticated and confirmed to be trusted in a security procedure may be loaded to run in the TEE. The SE is a software and hardware environment that may resist a physical attack and that has a very high level of security.

For example, the first request message includes login status information of the first application and a device certificate of the terminal, and/or a service certificate of the first application, an account of the first application, and a digital signature of the account of the first application. It should be noted that the device certificate of the terminal and a corresponding private key of the device certificate are prebuilt by a manufacturer, and may identify a security capacity of the terminal and the manufacturer of the terminal. The device certificate and the private key of the device certificate are stored in the security hardware. The device certificate may be submitted to an external entity, such as a server, while the private key of the device certificate is always stored in the security hardware. After installing the first application, the terminal may use the security hardware, such as the TEE or the SE, to generate an asymmetric key pair for the first application, where the asymmetric key pair includes a public key and a private key. The terminal sends the public key to the first application server having a function of issuing a service certificate, the first application server signs the public key and generates a service certificate of the first application. Because the pair of the public key and the private key corresponding to the service certificate is generated randomly by the terminal, the service certificate may be used to uniquely identify the first application on the terminal. The terminal signs the account of the first application by using the private key of the device certificate stored in the security hardware, or the private key of the service certificate, and generates the digital signature of the account of the first application.

For example, the first application server is concurrently an authorization server and a resource server, or the first application server is an authorization server.

Step 202: The first application server sends a first response message to the terminal, where the first response message includes generation information of the token binding identifier.

For example, the generation information of the token binding identifier includes an asymmetric key algorithm list supported by the first application server and/or a key exchange algorithm supported by the first application server. For example, asymmetric key algorithms include an RSA algorithm, an Elgamal algorithm, a knapsack algorithm, an elliptic curve cryptography, and the like. It should be noted that the asymmetric key algorithm requires an asymmetric key pair, that is, a public key and a private key. The public key is a public portion of the key pair, and the private key is a non-public portion of the key pair. If data is encrypted by using a public key, the data can be decrypted only by using a corresponding private key; if data is encrypted by using a private key, the data can be decrypted only by using a corresponding public key.

For example, before step 202, the method further includes: The first application server verifies validity of the device certificate and/or the service certificate of the first application, and verifies the digital signature information of the account of the first application. After verification is successful, the first application server records the device certificate of the terminal and/or the service certificate of the first application. It should be noted that the digital signature is a method for signing a message in an electronic form. In brief, the digital signature is some data attached to a data unit, or cryptographic transformation performed on a data unit. Such data or transformation allows a receiver of the data unit to confirm a source of the data unit and integrity of the data, and protect the data from being forged by a receiver. A digital signature process is: When sending a packet, a sender generates a packet abstract from a packet text by using a hash function, encrypts the packet abstract by using a private key of the sender, uses an encrypted packet abstract as a digital signature of the packet, and sends the digital signature of the packet along with the packet to a receiver. A digital signature verification process is: The receiver first obtains, through calculation by using a hash function the same as that of the sender, a packet abstract from an original packet that is received, and then decrypts the digital signature of the packet by using a public key of the sender. If an abstract obtained through decryption is the same as the packet abstract obtained through calculation by using the hash function, the receiver can confirm that the digital signature is from the sender. Digital signature is an encryption process, and digital signature verification is a decryption process. A digital signature involves the hash function, the public key of the sender, and the private key of the sender. For example, in the foregoing step 201, the first request message includes the digital signature of the first application, and a generation process of the digital signature is: By using the private key, stored in the security hardware, of the device certificate, the terminal generates an abstract from account information of the first application by using a hash function, then encrypts the abstract by using the private key of the device certificate, uses an encrypted abstract as the digital signature of the account of the first application, and sends the digital signature along with the account of the first application to the first application server. Correspondingly, a process of verifying the digital signature of the account of the first application by the first application server is: The first application server first obtains, through calculation, an abstract from received account information of the first application by using the hash function used by the terminal, and then decrypts the digital signature of the account of the first application by using the public key of the device certificate. If an abstract obtained through decryption is the same as the abstract obtained through calculation by using the hash function, the first application server confirms that the digital signature is from the terminal, and the digital signature of the account of the first application is verified successfully.

For example, the first application server is concurrently an authorization server and a resource server, or the first application server is an authorization server.

Step 203: The terminal generates the token binding identifier based on the generation information of the token binding identifier, and sends the token binding identifier to the first application server.

For example, the generation information of the token binding identifier includes an asymmetric key algorithm list supported by the first application server and/or a key exchange algorithm supported by the first application server. For example, the terminal determines, based on the asymmetric encryption algorithm list, an asymmetric key algorithm for generating the token binding identifier, where the security hardware of the terminal supports the asymmetric encryption algorithm for generating the token binding identifier.

For example, based on a priority order of algorithms in the asymmetric key algorithm list supported by the first application server, the terminal successively queries whether the security hardware of the terminal supports an algorithm, and uses an algorithm supported by the security hardware as the algorithm for generating the token binding identifier. If the terminal finds through check that the security hardware of the terminal does not support all asymmetric encryption algorithms supported by the first application server, the terminal prompts the user that the token binding identifier cannot be used and a security risk is present for the terminal. For example, the terminal queries whether the security hardware of the terminal supports a first optimal asymmetric encryption algorithm supported by the first application server. If the security hardware of the terminal supports the first optimal asymmetric encryption algorithm, the terminal uses the first optimal asymmetric encryption algorithm as the algorithm for generating the token binding identifier; if the security hardware of the terminal does not support the first optimal asymmetric encryption algorithm, the terminal queries whether the security hardware of the terminal supports a second optimal asymmetric encryption algorithm supported by the first application server.

For example, the terminal generates a key pair based on the asymmetric encryption algorithm for generating the token binding identifier, including a service public key and a service private key, where the service public key is the token binding identifier. In this embodiment, for a purpose of distinguishing a public key and a private key generated in this step from another key pair, the public key and the private key generated in this step are named the service public key and the service private key, respectively, and are not intended to constitute a limitation.

For example, after step 203, the method further includes step 203a: The terminal protects the service private key by using the security hardware (for example, the TEE or the SE), and sends the service public key, a validity period of the service public key, and a digital signature of the service public key to the first application server. For example, the terminal saves the service private key into the security hardware; or the terminal encrypts and saves the private key into a kernel of an operating system (Operating System, OS), and saves an encryption key of the private key into the security hardware. The digital signature of the service public key is a digital signature generated by the terminal by encrypting the service public key by using a private key corresponding to the device certificate or the service certificate of the first application. The validity period of the service public key may be set by the terminal, for example, the terminal may be 10 minutes or 2 hours, or other duration.

For example, after step 203a, the method further includes step 203b: The first application server verifies the digital signature of the service public key. After verifying that the digital signature is correct, the first application server saves the service public key, and associates the service public key with the device certificate and the account of the first application. For example, the first application server creates an access token management table. As shown in Table 1, the table is used to manage access tokens that are released by the first application server to the terminal.

TABLE 1

| Device certificate | Account of the first application | Access token | Service public key |
| --- | --- | --- | --- |

Step 204: The second application on the terminal sends a second request message to the first application server, where the second request message includes the token binding identifier, and the second request message is used for obtaining resource access permission of the first application server.

For example, the second request message may be an authorization open request message, used for obtaining a resource access token.

For example, before step 204, the method further includes step 204a: The second application sends a third request message to the first application, where the third request message is used for requesting to use the account of the first application to log into a server of the second application.

For example, after step 204a, the method further includes step 204b: The terminal sends a fourth request message to the first application server, where the fourth request message is used for requesting the resource access token. The fourth request message includes the device certificate and/or the service certificate of the first application, the account of the first application, the login status information of the first application, and an identifier (Application Identification, APPID) of the second application.

For example, the login status information of the first application may be the login credential of the first application or a pair of the account and the password of the first application.

For example, the identifier APPID of the second application may be a fixed static identifier that is applied for from an operator of an authorization server by an application developer during application development, and is used for identifying, by the authorization server, whether an application that applies for a resource is a valid application.

For example, after step 204b, the method further includes step 204c: After the first application server determines, through verification of the device certificate and/or the service certificate of the first application and the identifier of the second application, that the third request message is from a valid device and a valid second application, the first application server generates an access token, and associates the access token with the account of the first application, the device certificate, the identifier of the second application, and the token binding identifier (the service public key). For example, the device certificate is Device Certificate1, the account of the first application is Application accounts, the identifier of the second application is APPID1, the access token is Access Token1, and the service public key is Public Key1. A corresponding relationship thereof is recorded in the access token management table created by the first application server, as shown in Table 2.

TABLE 2

| Device certificate (Or service certificate of the first application) | Account of the first application | Service public key |
| --- | --- | --- |
| Device Certificate1 Identifier of the second application APPID1 | Application account1 | Public Key1 Access token Access Token1 |

For example, step 204c may alternatively be: After the first application server determines, through verification of the device certificate and/or the service certificate of the first application and the identifier of the second application, that the third request message is from a valid device and a valid second application, the first application server generates an access token and a set of challenge values, and associates the access token and the challenge values with the account of the first application, the device certificate, and the identifier of the second application. A challenge value may limit a use life of an access token. During use of the access token, a challenge value needs to be submitted simultaneously. When the set of challenge values is all used up, the terminal is forcibly required to apply for a new access token. For example, the device certificate is Device Certificate1, the account of the first application is Application accounts, the identifier of the second application is APPID1, the access token is Access Token1, the set of challenge values includes 10 challenge values, a first challenge value is Challenge1, a tenth challenge value is Challenge10, and the service public key is Public Key1. A corresponding relationship thereof is recorded in the access token management table created by the first application server, as shown in Table 3.

TABLE 3

| Device certificate (Or service certificate of the first application) | Account of the first application | Service public key |
|---|---|---|
| Device Certificate1 Identifier of the second application APPID1 | Application account1 Access token Access Token1 | Public Key1 Challenge value Challenge1 ... Challenge10 |

For example, after step 204c, the method further includes step 204d: The terminal receives the access token from the first application server, saves the access token, and associates the access token with the account of the first application. Alternatively, the terminal receives the access token and the set of challenge values from the first application server, saves the access token and the set of challenge values, and associates the access token and the set of challenge values with the account of the first application.

For example, when the terminal already stores the access token (or the access token and the challenge values) associated with the account of the first application, steps 204b, 204c, and 204d do not need to be performed. For example, if the second application on the terminal ever uses the account of the first application to log into the server of the second application, the terminal already stores the access token and the set of challenge values associated with the account of the first application, and the challenge values have not been used up, when the second application on the terminal requests to use the account of the first application again to log into the server of the second application, only step 204a is performed, without a need to perform steps 204b, 204c, and 204d. However, when the first application extracts the access token and the challenge values from the TEE, if the challenge values have all been used up or the validity period, defined by the terminal, of the public key already elapses, steps 204b, 204c, and 204d need to be performed, to apply for a new access token and a new set of challenge values.

For example, step 204 specifically includes: The second application on the terminal sends a fifth request message to the first application, where the fifth request message is used for requesting the first application server to authorize the second application to obtain the resource access permission of the first application server. The fifth request message includes the account of the first application that is bound to the second application. If the first application logs into a plurality of accounts simultaneously, the user may select one of the accounts to generate the fifth request message. The first application checks for an account associated with the first application, to confirm that an access token associated with the account of the first application exists. The first application obtains the service public key (or the service public key and one challenge value) of the first application from the TEE operating environment of the terminal, and generates a digital signature for the access token (or for the access token and the one challenge value) by using the service private key of the first application. The first application sends the second request message to the first application server, where the second request message is used for requesting the first application server to authorize the second application to obtain the resource access permission of the first application server. The second request message includes the service public key, that is, the token binding identifier, the identifier of the second application, the access token, and the digital signature of the access token (or the access token, the digital signature of the access token, the one challenge value, and the digital signature of the challenge value).

For example, step 204 may alternatively be: A third application on the terminal sends a second request message to the first application server, where the second request message includes the token binding identifier, and the second request message is used to request the first application server to authorize the third application to log into the first application server. It should be noted that both the second application and the third application are applications on a same terminal, and can log into respective servers by using a same account of the first application. For example, the second application may log into the server of the second application by using the account of the first application, and the third application may log into a server of the third application by using the account of the first application. Before logging into the respective servers by using the account of the first application, the second application and the third application need to separately request the resource access token from the first application server.

For example, the first application server is concurrently an authorization server and a resource server, or the first application server is an authorization server.

Step 205: The first application server sends a second response message to the terminal, where the second response message includes a resource of the first application server.

For example, the first application server is both a resource server and an authorization server. Step 205 specifically includes: The first application server performs querying in the access token management table based on the service public key, finds the access token based on the identifier of the second application, determines that the found access token is consistent with the access token (or the access token and the challenge value) included in the second request message, verifies that the digital signature of the access token (or the digital signature of the access token and the digital signature of the challenge value) is valid, and then returns the resource to the terminal by using the second response message.

For example, the first application server is a resource server. Before step 205, the method may further include: The resource server extracts the service public key, the access token, and the digital signature of the access token (or the access token, the digital signature of the access token, the challenge value, and the digital signature of the challenge value) from the second request message, and submits them to an authorization server for verification. Step 205 specifically includes: The authorization server performs querying in the access token management table based on the service public key, finds the access token based on the identifier of the second application, determines that the found access token is consistent with the access token (or the access token and the challenge value) included in the second request message, verifies that the digital signature of the access token (or the digital signature of the access token and the digital signature of the challenge value) is valid, and then prompts the resource server to return the resource. The resource server returns the resource by using the second response message.

It should be noted that when the authorization server determines that the validity period of the service public key elapses, the first application server does not send, to the terminal, the second response message including the resource, and steps 201 to 205 need to be performed again instead.

In the application program authorization method provided in this embodiment, the terminal negotiates the token binding identifier with the first application server. When third-party applications, such as the second application and the third application, require the first application to authorize using the account of the first application to log into corresponding servers of the third-party applications, the third-party applications may directly use the token binding identifier that is negotiated by the terminal and the first application server, without a need to separately negotiate the token binding identifier with the first application server. This simplifies an authorization procedure, and reduces a burden on the first application server.

Figure 3:
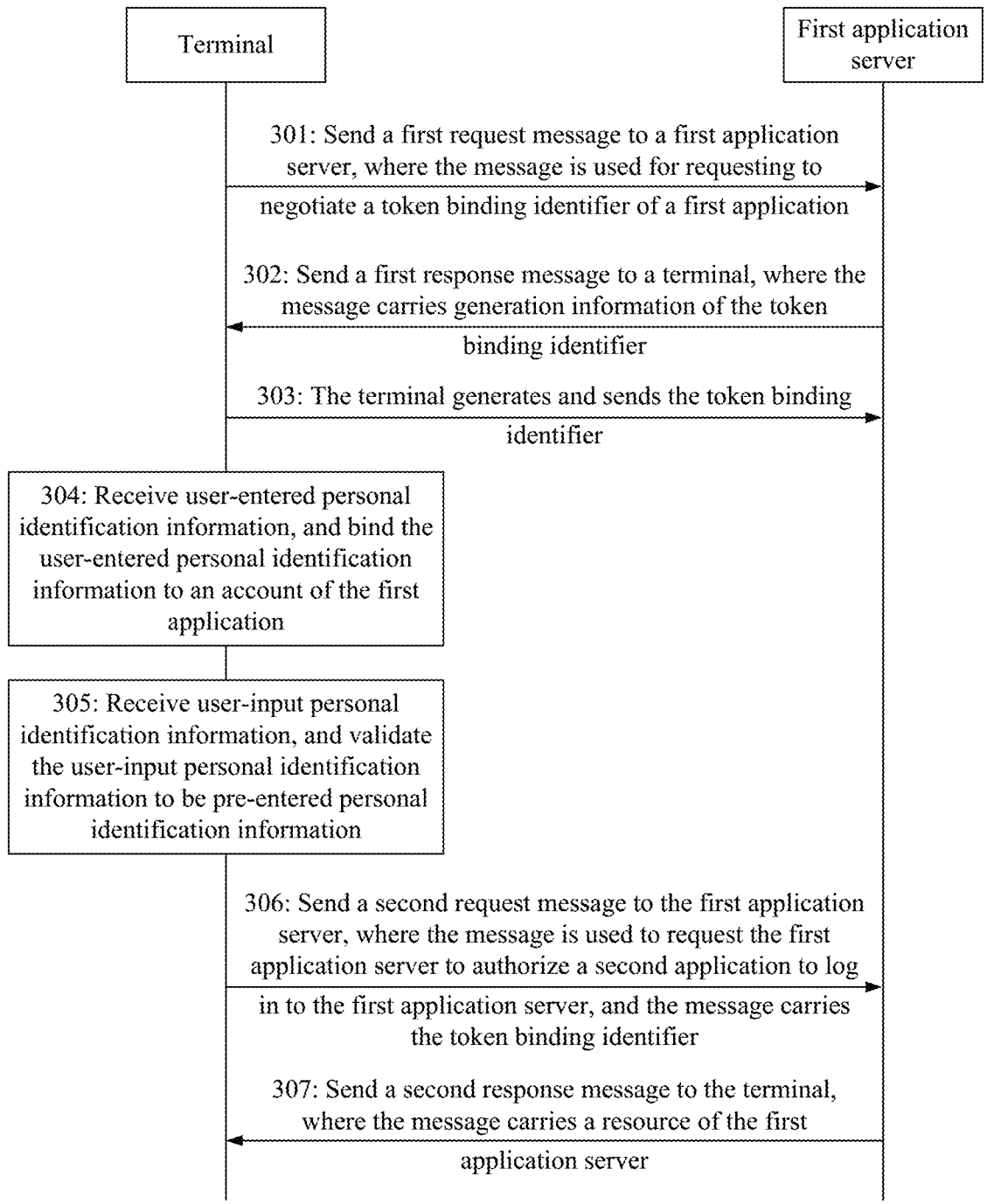
FIG. 3 is a schematic flowchart of another application program authorization method according to an embodiment of the present invention.

FIG. 3 is a schematic flowchart of another application program authorization method according to an embodiment of the present invention. As shown in FIG. 3, the embodiment may include the following steps:

Step 301: When a first application on a terminal is logged into successfully, the terminal sends a first request message to a first application server by using the first application, where the first request message is used for requesting to negotiate a token binding identifier of the first application.

Step 302: The first application server sends a first response message to the terminal, where the first response message includes generation information of the token binding identifier.

Step 303: The terminal generates the token binding identifier based on the generation information of the token binding identifier.

It should be noted that, for descriptions of steps 301 to 303, refer to steps 201 to 203 in the foregoing embodiment, and details are not described herein again.

Step 304: The terminal receives user-entered personal identification information, and binds the entered personal identification information to the token binding identifier.

For example, the personal identification information is at least one of the following information: a fingerprint, an iris, voice, a personal identification number (Personal Identification Number, PIN), an unlocking pattern, and the like. For example, the terminal prompts the user to enter a 6-digit numerical password, uses the entered 6-digit numerical password as the personal identification information to be associated with an account of the first application and a corresponding token binding identifier of the account of the first application.

Step 305: When a second application on the terminal triggers to log in by using account information of the first application, the terminal prompts the user to enter the personal identification information, the first application receives the user-input personal identification information, and the terminal determines that the user-input personal identification information is consistent with pre-entered personal identification information.

For example, a plurality of accounts access the first application simultaneously. The first application prompts the user to select one of the plurality of accounts and enter the personal identification information. The terminal determines that the user-input personal identification information is consistent with the pre-entered personal identification information.

For example, before step 305, the method further includes: The second application sends a third request message to the first application, where the third request message is used for requesting to use the account of the first application to log into a server of the second application.

Step 306: The second application on the terminal sends a second request message to the first application server, where the second request message includes the token binding identifier, and the second request message is used to request the first application server to authorize the second application to obtain resource access permission of the first application server.

For example, before performing step 306, if a terminal device has not been restarted, verification of the user personal identification information in step 306 is valid; if the terminal device has been restarted, before performing step 306, the terminal prompts the user to enter personal identification information, and determines that the personal identification information that is input this time is consistent with the pre-entered personal identification information.

Step 307: The first application server sends a second response message to the terminal, where the second response message includes a resource of the first application server.

It should be noted that, for descriptions of steps 306 and 307, refer to steps 204 and 205 in the foregoing embodiment, and details are not described herein.

In the application program authorization method provided in this embodiment, the terminal negotiates the token binding identifier with the first application server. When third-party applications, such as the second application and a third application, require the first application to authorize using the account of the first application to log into corresponding servers of the third-party applications, the third-party applications may directly use the token binding identifier that is negotiated by the terminal and the first application server, without a need to separately negotiate the token binding identifier with the first application server. This simplifies an authorization procedure, and reduces a burden on the first application server. In addition, after the terminal negotiates the token binding identifier with the first application server, the terminal receives the user-entered personal identification information corresponding to the account of the first application, and needs to verify personal identification information when authorizing using the account of the first application to log into a server of a third-party application. This effectively prevents a terminal device holder from using account information of an account owner to log into the third-party application without obtaining consent from the account owner, and prevents an asset associated with the account of the first application from being abused.

The foregoing describes in detail the methods according to the embodiments of the present invention with reference to FIG. 1 to FIG. 3, and the following describes in detail a terminal and an application server according to embodiments of the present invention with reference to FIG. 4 to FIG. 7.

Figure 4:
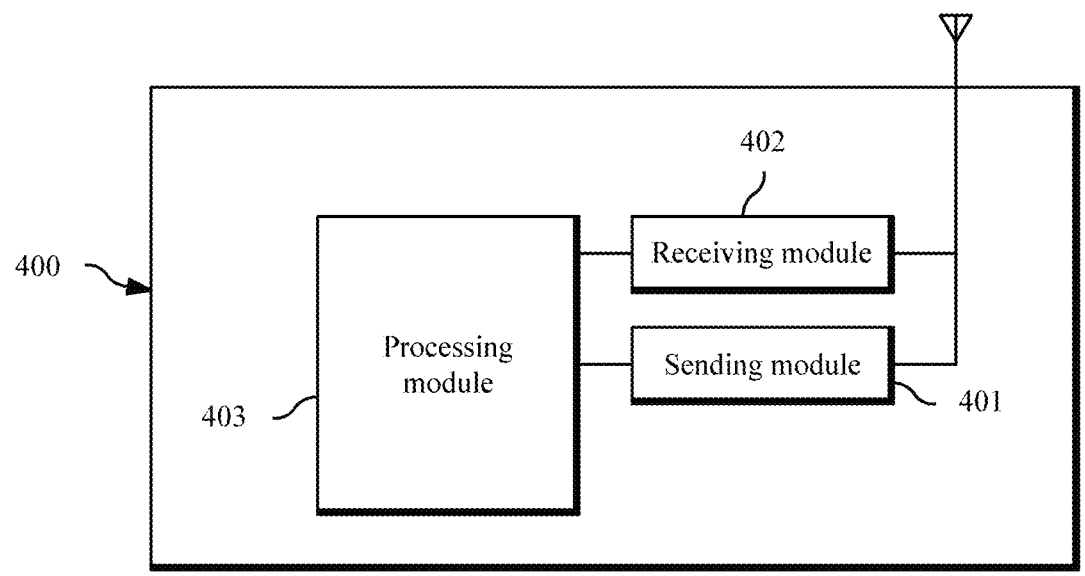
FIG. 4 is a schematic structural diagram of a terminal according to an embodiment of the present invention.

FIG. 4 is a schematic structural diagram of a terminal according to an embodiment of the present invention. The terminal 400 may include a sending module 401, a receiving module 402, and a processing module 403.

A person skilled in the art may understand that FIG. 4 shows only a simplified design of a structure of the terminal. The structure of the terminal shown in FIG. 4 does not constitute a limitation on the terminal, and the terminal may include more or fewer components than those shown in FIG. 4. For example, the terminal may further include a storage module configured to store an instruction corresponding to a communication algorithm. In addition, to save an area of a chip, the receiving module 402 and the sending module 401 may alternatively be integrated to form a transceiver.

In FIG. 4, the sending module 401 is configured to, when a first application on the terminal is logged into successfully, send a first request message to a first application server by using the first application, where the first request message is used for negotiating a token binding identifier of the first application. The receiving module 402 is configured to receive a first response message from the first application server, where the first response message includes generation information of the token binding identifier. The processing module 403 is configured to generate the token binding identifier based on the generation information of the token binding identifier, and send the token binding identifier to the first application server. The sending module 401 is further configured to, when at least one second application on the terminal logs in by using the first application, send a second request message to the first application server by using the at least second application, where the second request message is used for obtaining resource access permission of the first application server, and the second request message includes the token binding identifier.

For example, the generation information of the token binding identifier includes an asymmetric encryption algorithm list and/or a key exchange algorithm that are/is supported by the first application server, and the terminal includes security hardware. That the processing module 403 generates the token binding identifier based on the generation information of the token binding identifier includes: the processing module 403 determines, based on the asymmetric encryption algorithm list, an asymmetric encryption algorithm for generating the token binding identifier, where the security hardware supports the asymmetric encryption algorithm; and the processing module 403 generates a public key and a private key based on the asymmetric key algorithm, where the public key is the token binding identifier.

For example, that the processing module 403 generates the token binding identifier based on the generation information of the token binding identifier includes: determining a validity period of the token binding identifier, and protecting the private key by using the security hardware.

For example, the processing module 403 is further configured to, before the sending module 401 sends the second request message to the first application server by using the at least one second application, determine whether user-input personal identification information is consistent with personal identification information stored in the terminal. The receiving module 402 is further configured to receive the user-input personal identification information.

For example, the receiving module 402 is further configured to, after the processing module 403 generates the token binding identifier based on the generation information of the token binding identifier, receive user-entered personal identification information, where the entered personal identification information is the personal identification information stored in the terminal. The processing module 403 is further configured to bind the entered personal identification information to the token binding identifier, where the entered personal identification information is used for accessing the token binding identifier.

For example, the personal identification information is at least one of the following information: a fingerprint, an iris, voice, a personal identification number PIN code, an unlocking pattern, and the like.

For example, the first request message includes a device certificate of the terminal and login status information of the first application; or includes a service certificate of the first application and login status information of the first application.

For example, the second request message includes identification information of the at least one second application.

The terminal provided in this embodiment negotiates the token binding identifier with the first application server. When third-party applications, such as the second application and a third application, require the first application to authorize using an account of the first application to log into corresponding servers of the third-party applications, the third-party applications may directly use the token binding identifier that is negotiated by the terminal and the first application server, without a need to separately negotiate the token binding identifier with the first application server. This simplifies an authorization procedure, and reduces a burden on the first application server. In addition, after the terminal negotiates the token binding identifier with the first application server, the terminal receives the user-entered personal identification information corresponding to the account of the first application, and needs to verify personal identification information when authorizing using the account of the first application to log into a server of a third-party application. This effectively prevents a terminal device holder from using account information of an account owner to log into the third-party application without obtaining consent from the account owner, and prevents an asset associated with the account of the first application from being abused.

Figure 5:
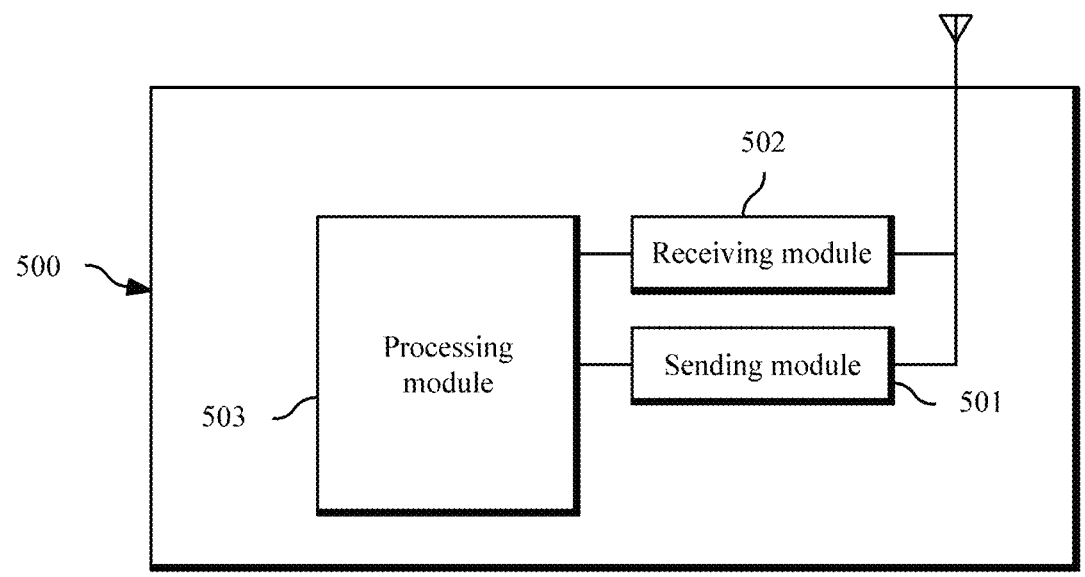
FIG. 5 is a schematic structural diagram of an application server according to an embodiment of the present invention.

FIG. 5 is a schematic structural diagram of an application server according to an embodiment of the present invention. The application server 500 may include a sending module 501 and a receiving module 502.

A person skilled in the art may understand that FIG. 5 shows only a simplified design of a structure of the application server. The structure of the application server shown in FIG. 5 does not constitute a limitation on the application server, and the application server may include more or fewer components than those shown in FIG. 5. For example, the application server may further include a storage module configured to store an instruction corresponding to a communication algorithm and a processing module 503. The processing module 503 may be configured to control the sending module 502 and the receiving module 503 to process the instruction in the storage module. In addition, to save an area of a chip, the receiving module 502 and the sending module 501 may alternatively be integrated to form a transceiver.

In FIG. 5, the receiving module 502 is configured to receive a first request message from a terminal, where the first request message is used for requesting to negotiate a token binding identifier of a first application. The sending module 501 is configured to send a first response message to the terminal, where the first response message includes generation information of the token binding identifier. The receiving module 502 is further configured to receive the token binding identifier from the terminal. The receiving module 502 is further configured to receive a second request message from the terminal, where the second request message is used for obtaining resource access permission of the first application server, and the second request message includes the token binding identifier.

For example, the generation information of the token binding identifier includes an asymmetric key algorithm list and/or a key exchange algorithm that are/is supported by the first application server, and the token binding identifier is a public key in a key pair generated by the terminal.

For example, the first request message includes a device certificate of the terminal and login status information of the first application; or includes a service certificate of the first application and login status information of the first application.

For example, the second request message includes identification information of at least one second application.

According to the application server provided in this embodiment, the terminal negotiates the token binding identifier with the application server. When third-party applications, such as the second application and a third application, require the first application to authorize using an account of the first application to log into corresponding servers of the third-party applications, the third-party applications may directly use the token binding identifier that is negotiated by the terminal and the application server, without a need to separately negotiate the token binding identifier with the application server. This simplifies an authorization procedure, and reduces a burden on the first application server. In addition, after the terminal negotiates the token binding identifier with the application server, the terminal receives the user-entered personal identification information corresponding to the account of the first application, and needs to verify personal identification information when authorizing using the account of the first application to log into a server of a third-party application. This effectively prevents a terminal device holder from using account information of an account owner to log into the third-party application without obtaining consent from the account owner, and prevents an asset associated with the account of the application from being abused.

Figure 6:
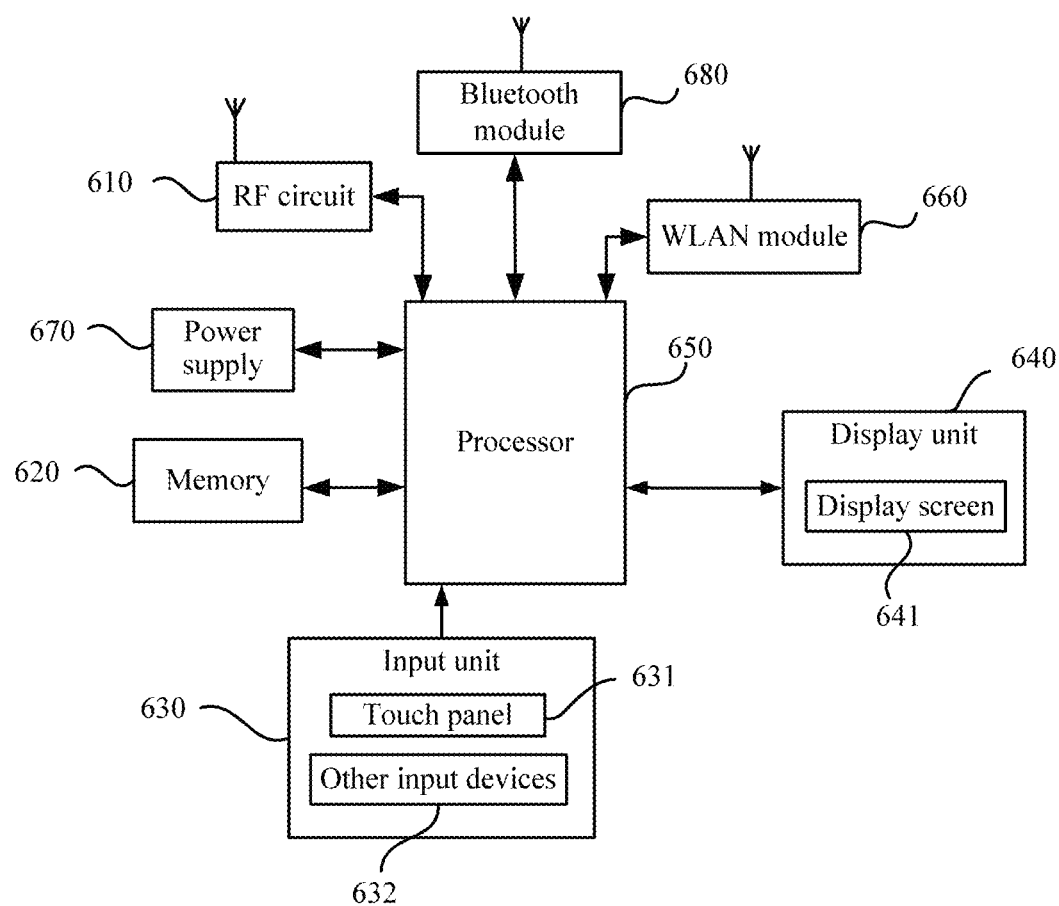
FIG. 6 is a schematic structural diagram of another terminal according to an embodiment of the present invention.

FIG. 6 is a schematic structural diagram of another terminal according to an embodiment of the present invention. As shown in FIG. 6, the terminal 600 includes components such as a radio frequency (RF) circuit 610, a memory 620, an input unit 630, a display unit 640, a processor 650, a wireless local area network (WLAN) module 660, a power supply 670, and a Bluetooth module 680. A person skilled in the art may understand that a structure of the terminal shown in FIG. 6 does not constitute a limitation on the terminal, and the terminal may include more or fewer components than those shown in the figure, or a combination of some components, or components arranged in a different manner.

The RF circuit 610 may be configured to send/receive information, for example, connect to a mobile broadband. Generally, the RF circuit 610 includes but is not limited to an antenna, at least one amplifier, a transceiver, a coupler, a low noise amplifier (LNA), a duplexer, and the like. In addition, the RF circuit 610 may further forward a mobile broadband service to the WLAN module 660, so as to forward the mobile broadband service to another terminal by using the WLAN module 660. Any communications standard or protocol may be used for wireless communication, including but not limited to a Global System for Mobile Communications (GSM), a General Packet Radio Service (GPRS), Code Division Multiple Access (CDMA), Wideband Code Division Multiple Access (Wideband Code Division Multiple Access, WCDMA), Long Term Evolution (LTE), an email, and a short messaging service (SMS).

The memory 620 may be configured to store a program instruction. The processor 650 executes the program instruction stored in the memory 620, so that the terminal executes the application program authorization methods shown in FIG. 2 and FIG. 3. The memory 620 may mainly include a program storage area and a data storage area. The program storage area may store an operating system, an application program required for implementing the application program authorization method, and the like. The data storage area may store list information of the terminal, data generated when the terminal implements the application program authorization method, and the like. In addition, the memory 620 may include a volatile memory (volatile memory), for example, a random-access memory (random-access memory, RAM). The memory 620 may alternatively include a non-volatile memory (non-volatile memory), for example, a read-only memory (ROM), a flash memory (flash memory), a hard disk drive (HDD), or a solid-state drive (SSD). The memory 620 may further include a combination of the foregoing memories.

The input unit 630 may be configured to receive numeral or character information input by a user, including an instruction for enabling a WLAN hotspot, an instruction for selecting a terminal sharing the WLAN hotspot, and the like. Specifically, the input unit 630 may include a touch panel 631 and other input devices 632. The touch panel 631, also referred to as a touchscreen, is capable of collecting a touch operation performed by a user on or in the vicinity of the touch panel 631 (for example, an operation performed on the touch panel 631 or in the vicinity of the touch panel 631 by the user by using a finger, a stylus, or any other appropriate object or accessory), and drive a corresponding connection apparatus according to a preset program. Optionally, the touch panel 631 may include two parts: a touch detection apparatus and a touch controller. The touch detection apparatus detects a touch orientation of the user, detects a signal brought by a touch operation, and transmits the signal to the touch controller. The touch controller receives touch information from the touch detection apparatus, converts the touch information into contact coordinates, and sends the contact coordinates to the processor 650, and can receive a command sent by the processor 650 and execute the command. In addition, the touch panel 631 in the input unit 630 may be implemented in various types, such as a resistive type, a capacitive type, an infrared type, and a surface acoustic wave type. In addition to the touch panel 631, the input unit 630 may further include the other input devices 632. Specifically, the other input devices 632 may include but are not limited to one or more of a physical keyboard, a function key (such as a volume control key or a switch key), a trackball, a mouse, a joystick, and the like.

The display unit 640 may be configured to display information input by the user, information provided to the user, and various menus of the terminal. The display unit 640 may include a display screen 641. Optionally, the display screen 641 may be configured in a form such as a liquid crystal display (LCD) or an organic light-emitting diode (OLED). Further, the touch panel 631 may cover the display screen 641. After detecting a touch operation on or in the vicinity of the touch panel 631, the touch panel 631 sends the touch operation to the processor 650 to determine a touch event type. Then the processor 650 provides corresponding visual output on the display screen 641 based on the touch event type. Although the touch panel 631 and the display screen 641 in FIG. 6 are used as two independent parts to implement input and input functions of the terminal, in some embodiments, the touch panel 631 and the display screen 641 may be integrated to implement the input and output functions of the terminal.

The processor 650 is a control center of the terminal, and is connected to various parts of the entire terminal by using various interfaces and lines, run or execute software programs and/or modules stored in the memory 620 and invoke data stored in the memory 620, to perform the application program authorization methods shown in FIG. 2 or FIG. 3. Optionally, the processor 650 may include one or more processing units. Preferably, an application processor and a modem processor may be integrated in the processor 650. The application processor mainly processes an operating system, a user interface, an application program, and the like. The modem processor mainly processes wireless communication. It can be understood that the modem processor may alternatively be not integrated in the processor 650.

The WLAN module 660 may be configured to help the user to send/receive an email, browse a webpage, access streaming media, and the like. The WLAN module 660 provides wireless broadband WLAN Internet access for the user. WLAN is a short-range wireless transmission technology. With the WLAN module 660, the terminal can access a WLAN hotspot. The terminal can also enable a WLAN spot by using the WLAN module 660, to forward a mobile broadband service to another terminal. The WLAN module 660 may also perform Wi-Fi broadcasting and scanning, to implement wireless communication with another terminal around.

The terminal further includes the power supply 670 (for example, a battery) that supplies power to the components. Optionally, the power supply may be logically connected to the processor 650 by using a power supply management system. In this way, functions such as management of charging, discharging, and power consumption are implemented by using the power supply management system.

The Bluetooth module 670 may be a Bluetooth low energy (BLE) device, a conventional Bluetooth device, or a dual-mode Bluetooth device that supports both the conventional Bluetooth and the BLE. The Bluetooth module 670 establishes a BLE or conventional Bluetooth connection with another terminal. The Bluetooth module 670 further performs BR or BLE broadcasting and scanning, to implement wireless communication with another terminal around.

Although not shown, the terminal may further include a camera, a loudspeaker, and the like, and details are not described herein.

For example, the RF circuit 610, the Bluetooth module 680, and the WLAN module 660 may be collectively referred to as a wireless communications interface.

For example, the terminal includes the processor 650, the memory 620, and the wireless communications interface. The memory 620 is configured to store a program instruction, and the processor 650 is configured to perform the following operations based on the program instruction stored in the memory 620: instructing the wireless communications interface to, when a first application on a terminal is logged into successfully, send a first request message to a first application server by using the first application, where the first request message is used for negotiating a token binding identifier of the first application; instructing the wireless communications interface to receive a first response message from the first application server, where the first response message includes generation information of the token binding identifier; generating the token binding identifier based on the generation information of the token binding identifier, and sending the token binding identifier to the first application server; and instructing the wireless communications interface to, when at least one second application on the terminal logs in by using the first application, send a second request message to the first application server, where the second request message is used for obtaining resource access permission of the first application server, and the second request message includes the token binding identifier.

For example, the generation information of the token binding identifier includes an asymmetric encryption algorithm list supported by the first application server, and the terminal includes security hardware; and that the processor 650 is configured to perform the following operation based on the program instruction stored in the memory 620: generating the token binding identifier based on the generation information of the token binding identifier includes: determining, based on the asymmetric encryption algorithm list, an asymmetric encryption algorithm for generating the token binding identifier, where the security hardware supports the asymmetric encryption algorithm; and generating a public key and a private key based on the asymmetric key algorithm, where the public key is the token binding identifier.

For example, that the processor 650 is configured to perform the following operation based on the program instruction stored in the memory 620: generating the token binding identifier based on the generation information of the token binding identifier includes: determining a validity period of the token binding identifier, and protecting the private key by using the security hardware.

For example, the terminal further includes an input unit 630, and the processor 650 is further configured to perform the following operations based on the program instruction stored in the memory 620: before instructing the wireless communications interface to send the second request message to the first application server, instructing the input unit 630 to receive user-input personal identification information, and determining that the user-input personal identification information is consistent with personal identification information stored in the terminal.

For example, the processor 650 is further configured to perform the following operations based on the program instruction stored in the memory 620: after generating the token binding identifier based on the generation information of the token binding identifier, instructing the input unit to receive user-entered personal identification information, where the entered personal identification information is the personal identification information stored in the terminal; and binding the entered personal identification information to the token binding identifier, where the entered personal identification information is used for accessing the token binding identifier.

For example, the personal identification information is at least one of the following information: a fingerprint, an iris, voice, a personal identification number PIN code, an unlocking pattern, and the like.

For example, the first request message includes a device certificate of the terminal and login status information of the first application; or includes a service certificate of the first application and login status information of the first application.

For example, the second request message includes identification information of the at least one second application.

The terminal provided in this embodiment negotiates the token binding identifier with the first application server. When third-party applications, such as the second application and a third application, require the first application to authorize using an account of the first application to log into corresponding servers of the third-party applications, the third-party applications may directly use the token binding identifier that is negotiated by the terminal and the first application server, without a need to separately negotiate the token binding identifier with the first application server. This simplifies an authorization procedure, and reduces a burden on the first application server. In addition, after the terminal negotiates the token binding identifier with the first application server, the terminal receives the user-entered personal identification information corresponding to the account of the first application, and needs to verify personal identification information when authorizing using the account of the first application to log into a server of a third-party application. This effectively prevents a terminal device holder from using account information of an account owner to log into the third-party application without obtaining consent from the account owner, and prevents an asset associated with the account of the first application from being abused.

Figure 7:
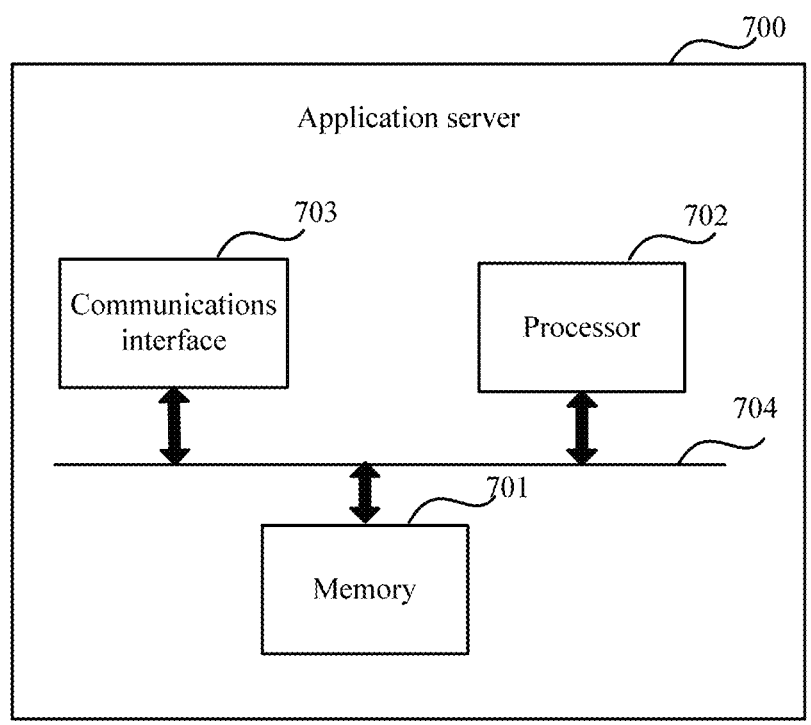
FIG. 7 is a schematic structural diagram of another application server according to an embodiment of the present invention.

FIG. 7 is a schematic structural diagram of another application server according to an embodiment of the present invention. As shown in FIG. 7, the application server 700 includes components such as a memory 701, a processor 702, and a communications interface 703. The memory 701 may be configured to store program code and data of the application server. The processor 702 may be a central processing unit (Central Processing Unit, CPU), a general-purpose processor, a digital signal processor (DSP), an application-specific integrated circuit (ASIC), a field programmable gate array (FPGA) or another programmable logic device, a transistor logic device, a hardware device, or any combination thereof. The processor may implement or execute various example logical blocks, modules, and circuits described with reference to content disclosed in the present invention. Alternatively, the processor may be a combination implementing a computing function, for example, a combination including one or more microprocessors, or a combination of a DSP and a microprocessor. The communications interface is a collective name, and may include one or more interfaces. A person skilled in the art should understand that a structure of the application server shown in FIG. 7 does not constitute a limitation on the application server, and the application server may include more or fewer components than those shown in the figure, or a combination of some components, or the components arranged in a different manner. For example, the application server may further include a bus 704. The communications interface 703, the processor 702, and the memory 701 may be connected to each other by using the bus 704. The bus 704 may be a Peripheral Component Interconnect (Peripheral Component Interconnect, PCI for short) bus, an extended industry standard architecture (Extended Industry Standard Architecture, EISA for short) bus, or the like. The bus 704 may be classified into an address bus, a data bus, a control bus, and the like. For ease of representation, only one thick line is used to represent the bus in FIG. 7, but this does not mean that there is only one bus or only one type of bus.

As shown in FIG. 7, the memory 701 is configured to store a program instruction, and the processor 702 is configured to perform the following operations based on the program instruction stored in the memory 701: instructing the communications interface 703 to receive a first request message from a terminal, where the first request message is used for requesting to negotiate a token binding identifier of a first application; instructing the communications interface 703 to send a first response message to the terminal, where the first response message includes generation information of the token binding identifier; instructing the communications interface 703 to receive the token binding identifier from the terminal; and instructing the communications interface 703 to receive a second request message from the terminal, where the second request message is used for obtaining resource access permission of the first application server, and the second request message includes the token binding identifier.

For example, the generation information of the token binding identifier includes an asymmetric key algorithm list supported by the first application server, and the token binding identifier is a public key in a key pair generated by the terminal.

For example, the first request message includes the first request message includes a device certificate of the terminal and login status information of the first application; or includes a service certificate of the first application and login status information of the first application.

For example, the second request message includes identification information of at least one second application.

According to the application server provided in this embodiment, the terminal negotiates the token binding identifier with the application server. When third-party applications, such as the second application and a third application, require the first application to authorize using an account of the first application to log into corresponding servers of the third-party applications, the third-party applications may directly use the token binding identifier that is negotiated by the terminal and the application server, without a need to separately negotiate the token binding identifier with the application server. This simplifies an authorization procedure, and reduces a burden on the first application server. In addition, after the terminal negotiates the token binding identifier with the application server, the terminal receives the user-entered personal identification information corresponding to the account of the first application, and needs to verify personal identification information when authorizing using the account of the first application to log into a server of a third-party application. This effectively prevents a terminal device holder from using account information of an account owner to log into the third-party application without obtaining consent from the account owner, and prevents an asset associated with the account of the application from being abused.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention shall fall within the protection scope of the present invention.

What is claimed is:
1. A method, comprising:
sending, by a terminal, after a first application on the terminal is logged into successfully, a first request message to a first application server by using the first application, wherein the first request message is used for requesting to negotiate a token binding identifier of the first application;
receiving, by the terminal, a first response message from the first application server, wherein the first response message comprises generation information of the token binding identifier;

generating, by the terminal, the token binding identifier based on the generation information of the token binding identifier;

sending, by the terminal, the token binding identifier to the first application server; and sending, by the terminal, a second request message to the first application server, requesting access to the first application server by at least one second application on the terminal using the token binding identifier of the first application, the at least one second application different than the first application and configured to log in by using the first application, wherein the second request message is used for obtaining resource access permission of the first application server for the at least one second application, and the second request message comprises the token binding identifier; and wherein the sending the second request message to the first application server comprises:

receiving, by the terminal, user-input personal identification information;

determining, by the terminal, that the user-input personal identification information is consistent with personal identification information stored in the terminal; and sending, by the at least one second application on the terminal, the second request message to the first application server; and wherein the method further comprises:

after the generating the token binding identifier:

receiving, by the terminal, user-preentered personal identification information, wherein the user-preentered personal identification information is the personal identification information stored in the terminal; and binding, by the terminal, the user-preentered personal identification information to the token binding identifier, wherein the user-preentered personal identification information is used for accessing the token binding identifier.

2. The method according to claim 1, wherein the generation information of the token binding identifier comprises an asymmetric encryption algorithm list supported by the first application server, wherein the terminal comprises security hardware, and wherein the generating the token binding identifier comprises:

determining, by the terminal based on the asymmetric encryption algorithm list, an asymmetric encryption algorithm for generating the token binding identifier, wherein the security hardware supports the asymmetric encryption algorithm; and generating, by the terminal, a public key and a private key based on the asymmetric encryption algorithm, wherein the public key comprises the token binding identifier.

3. The method according to claim 2, wherein the generating the token binding identifier comprises:

determining, by the terminal, a validity period of the token binding identifier; and protecting, by the terminal, the private key by using the security hardware.

4. The method according to claim 1, wherein the personal identification information is at least one of a fingerprint, an iris, voice, a personal identification number PIN code, or an unlocking pattern.

5. The method according to claim 1, wherein the first request message comprises at least one of:

a device certificate of the terminal and login status information of the first application, or a service certificate of the first application and the login status information of the first application.

6. The method according to claim 1, wherein the second request message comprises identification information of the at least one second application.

7. A method, comprising:

receiving, by a first application server, a first request message from a terminal, wherein the first request message is used for requesting to negotiate a token binding identifier of a first application;

sending, by the first application server, a first response message to the terminal, wherein the first response message comprises generation information of the token binding identifier;

receiving, by the first application server, the token binding identifier from the terminal; and receiving, by the first application server, a second request message from the terminal, requesting access to the first application server by at least one second application on the terminal using the token binding identifier of the first application, the at least one second application different than the first application, wherein the second request message is used for obtaining resource access permission of the first application server, and the second request message comprises the token binding identifier; and wherein the generation information of the token binding identifier comprises an asymmetric encryption algorithm list supported by the first application server, and the token binding identifier comprises a public key in a key pair generated by the terminal;

wherein the first request message comprises at least one of:

a device certificate of the terminal and login status information of the first application, or a service certificate of the first application and the login status information of the first application; and wherein the second request message comprises identification information of the at least one second application.

8. A terminal, comprising:

a processor; and a non-transitory computer-readable storage medium storing a program to be executed by the processor, the program including instructions to:

send a first request message to a first application server by using a first application on the terminal, after the first application on the terminal is logged into successfully, wherein the first request message is used for requesting to negotiate a token binding identifier of the first application;

receive a first response message from the first application server, wherein the first response message comprises generation information of the token binding identifier;

generate the token binding identifier based on the generation information of the token binding identifier;

send the token binding identifier to the first application server; and send a second request message to the first application server, requesting access to the first application server by at least one second application on the terminal using the token binding identifier of the first application, the at least one second application different than the first application and configured to log in by using the first application, wherein the second request message is used for obtaining resource access permission of the first application server for the at least one second application, and the second request message comprises the token binding identifier; and wherein the program further includes instructions to:
receive user-input personal identification information;
determine that the user-input personal identification information is consistent with personal identification information stored in the terminal; and
send the second request message to the first application server by the at least one second application on the terminal; and wherein the program further includes instructions to:
after the generating the token binding identifier:
receive user-preentered personal identification information, wherein the user-preentered personal identification information is the personal identification information stored in the terminal; and
bind the user-preentered personal identification information to the token binding identifier, wherein the user-preentered personal identification information is used for accessing the token binding identifier.

9. The terminal according to claim 8, wherein the generation information of the token binding identifier comprises an asymmetric encryption algorithm list supported by the first application server, wherein the terminal further comprises security hardware, and wherein the program further includes instructions to:

determine an asymmetric encryption algorithm for generating the token binding identifier, based on the asymmetric encryption algorithm list, wherein the security hardware supports the asymmetric encryption algorithm; and
generate a public key and a private key based on the asymmetric encryption algorithm, wherein the public key comprises the token binding identifier.

10. The terminal according to claim 9, wherein the program further includes instructions to:
determine a validity period of the token binding identifier; and
protect the private key by using the security hardware.

11. The terminal according to claim 8, wherein the personal identification information is at least one of a fingerprint, an iris, voice, a personal identification number PIN code, or an unlocking pattern.

12. The terminal according to claim 8, wherein the first request message comprises at least one of:
a device certificate of the terminal and login status information of the first application, or
a service certificate of the first application and the login status information of the first application.

13. The terminal according to claim 8, wherein the second request message comprises identification information of the at least one second application.

* * * * *